Feb. 6, 1968     D. C. CARTER ET AL     3,367,828
HOT, WET PRESSING TECHNIQUE OF FORMING FIBERBOARD
Original Filed Dec. 17, 1959
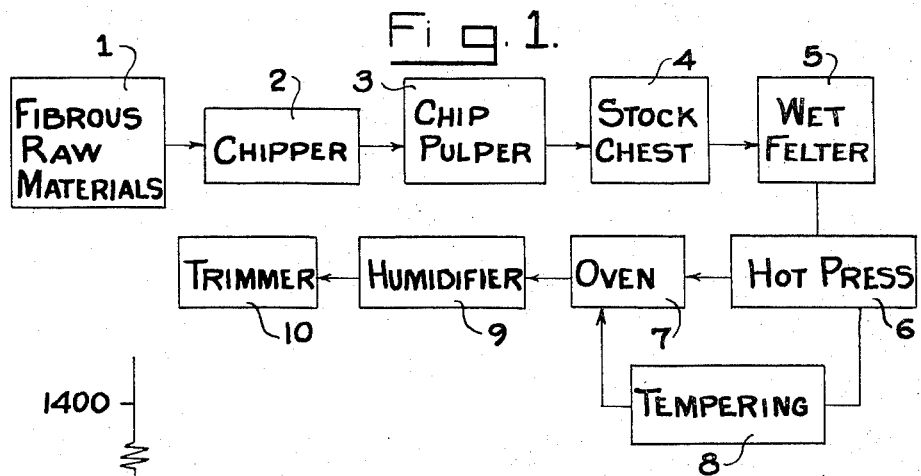
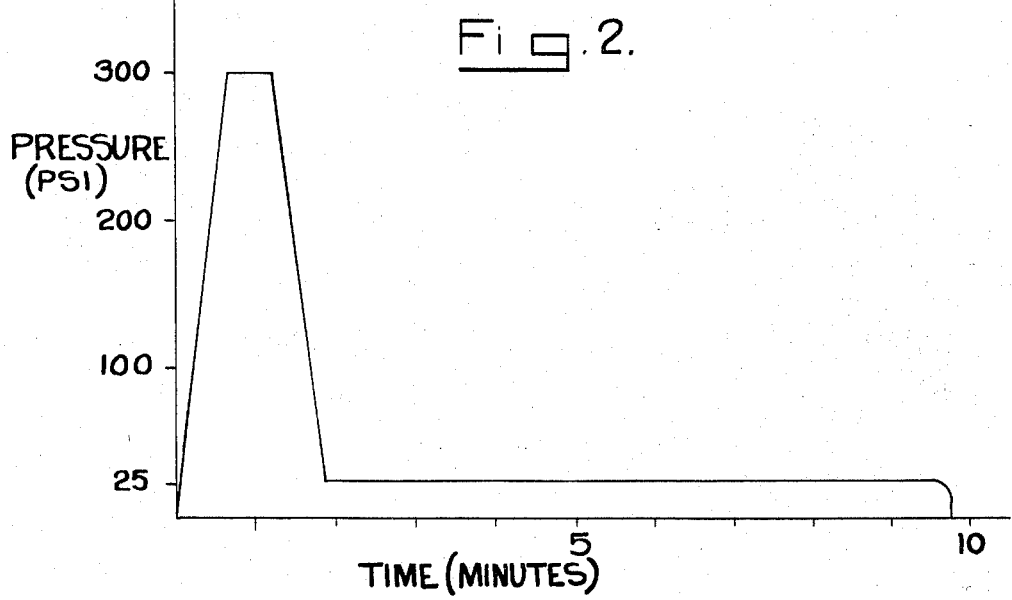
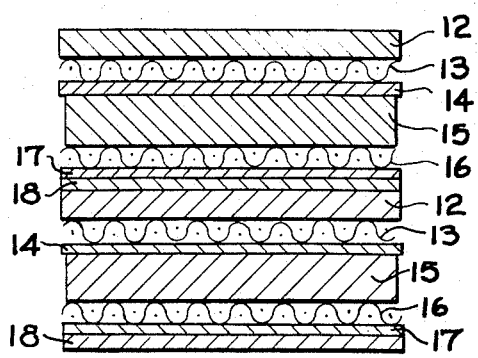
INVENTOR.
DAVID C. CARTER
DAVID E. NOYES
John A. McKinney
ATTORNEY

United States Patent Office 3,367,828
Patented Feb. 6, 1968

3,367,828
HOT, WET PRESSING TECHNIQUE OF FORMING FIBERBOARD
David C. Carter, Martinsville, and David E. Noyes, Somerville, N.J., assignors to Johns-Manville Corporation, New York, N.Y., a corporation of New York
Continuation of application Ser. No. 860,197, Dec. 17, 1959. This application Aug. 26, 1964, Ser. No. 393,811
4 Claims. (Cl. 162—225)

This is a continuation of Ser. No. 860,197, filed Dec. 17, 1959, and now abandoned.

This invention relates to a method of manufacturing fiberboard; more specifically, it relates to a method of manufacturing fiberboard within the medium density range, commonly referred to as "semi-hardboard," and to the article produced by the novel method.

Boards manufactured from cellulosic fibers, and the like, fall into two main categories, particle boards and fiberboards. In particle board manufacture, the basic fibers are admixed with a relatively high percentage of binder material, and the mixture is compressed to produce the final board-like product. The lignous materials, commonly found as a constituent in many of the raw materials utilized in the manufacture of particle boards, are not ordinarily used as a binder, and the main binder is usually an additive inserted prior to compression of the mixture. The particle boards likewise do not utilize any form of interfelting of the fibers to increase the cohesive bond of the final board produced. Fiberboards, on the other hand, usually utilize interfelting of the fibers to produce an initial cohesive bond among the fibers of the board. The binder material, if utilized in the manufacture of fiberboards, is often the lignin contained as a natural constituent of the initial raw materials, or it may be an additive admixed with the fibers, or it may be a combination of both, and additive and an original constituent. This invention relates exclusively to fiberboard manufacture, as contrasted with particle board manufacture, and specifically to a particular type of fiberboard as delineated hereinafter.

Fiberboards may be classified by their density ranges. A common classification by densities includes low density fiberboards, medium density fiberboards or semi-hardboards, and hardboards. The low density fiberboards are in the range of approximately 9–25 lbs. per cu. ft.; the medium density fiberboards are usually considered to be those boards within a density range of approximately 25–50 lbs. per cu. ft.; and the hardboards are usually considered to be those fiberboards having a specific gravity of approximately 1, or greater, or having a density within the range of at least approximately 55 lbs. per cu. ft.

Another system of classifying fiberboards is based on the type of process utilized in forming the boards. The fiberboards may be formed into a mat utilizing a dry process or a wet felting process, and, if the boards are compressed, the press may be a hot dry press or a hot wet press.

The dry process of forming the fibers into a mat consists primarily of air felting the fibers and depositing such fibers upon a conveyor belt for further treatment. The effective chemical constituents, such as, for example, the binder, may be contained within the original raw materials, or additives may be injected during the felting step. In the wet process technique of forming the fibers into a mat, a slurry of fibers and water is formed, which slurry commonly also includes the necessary additives, and the wetted fibers are picked up and deposited upon a conveyor by a Fourdrinier or an Oliver machine, similar to the types of machines used in the manufacture of paper.

The mat, formed by either of the mat formation techniques noted, may be passed to a baking oven without any further compression to produce the final fiberboard product. Such a technique is commonly used in the manufacture of low density fiberboards. With the higher density fiberboards, the formed mat is usually hot pressed, utilizing either a dry press or a wet press depending upon whether the fibrous mat is in the dry form or in the wet form, respectively. However, the dry mat does not necessarily have to be formed by the dry process technique of matting the fibers in order to utilize the dry press technique, as a formed wet mat may be subsequently dried, by passing such a mat through a baking or drying oven, to result in a relatively dry mat suitable for dry pressing.

The dry and wet pressing techniques are basically similar in that presses of the same type are utilized; however, the pressing temperatures, pressures and pressure cycles between the two techniques are quite different since many of the problems related to the dry press technique are not found in the wet press technique, and vice versa. For example, one of the problems in the dry process technique is scorching of the mat under compression; this problem is not usually encountered in the wet press technique due to the large percentage of water contained within the wet mat under compression. On the other hand, in the wet press technique, for example, a large amount of steam is generated which requires that the steam be kept under constant control to prevent rupture to the mats being formed, commonly referred to as "blowouts"; in the dry press technique, steam is not a factor which must be taken into serious consideration, since the mat under compression has a relatively low percentage of water therein.

This invention is concerned primarily with semi-hardboard or fiberboard in the medium density range, as defined herein, and it may be further classified by stating that it is concerned with the wet formation technique of forming the fibers into mats, or the wet lap method, and the hot, wet pressing technique of compressing the formed wet mats.

The binders commonly used in forming fiberboards by any of the processes noted above are usually lignins, originally contained with the lignocellulose types of raw materials, or may be additives admixed with the fibers during the formation of the mat or added to the slurry prior to mat formation. The additive can also be a lignin-type binder. Where lignins are used as the binder, the temperatures utilized within the process must be of such a degree that the lignous materials are activated to produce a binding action. The mat forming steps and cycle of the present invention are of such a nature that, although lignocellulose materials may be utilized with the original raw ingredients in the formation of the fiberboards, it is believed that the lignins, for the most part, are insufficiently activated during the board formation stage, which includes hot pressing of the formed mats, to produce any appreciable binding action. Consequently, this invention relates to those processes of manufacturing fiberboards which utilize an added binder to combine the interfelted fibers cohesively under the action of heat and pressure into a compact homogeneous mat.

An object of this invention therefore is a novel process for forming fiberboard of the intermediate density type, commonly referred to as "semi-hardboard."

A further object of this invention is to produce a novel type of fiberboard within a density range between approximately 25–50 lbs. per cu. ft.

A further object of this invention is to produce a novel fiberboard from the novel process of this invention.

A still further object of this invention is to produce a novel wet press cycle of compressing a fibrous mat formed by the wet-lap forming technique.

In brief, this invention relates to a process for manufacturing fiberboards in the intermediate density or medium density range, commonly referred to as semi-hardboard, and to the article formed thereby. The fibers utilized as the raw material for the formation of the fiberboard are commonly of a cellulosic nature; where a lignocellulosic raw material is utilized, the fiber forming process is such that it usually removes a portion of the lignins found with such cellulosic raw materials. To form a compressed mat capable of retaining its shape, a relatively small percentage of an added thermosetting resin is utilized as a binder. The fibers are formed into a mat on a conveyor system by what is commonly referred to as the wet process or the wet felting process or the wet lap method and the resultant interfelted mat of fibers is compressed by what is commonly referred to as a hot, wet pressing technique, or the wet press process. The cycle during the wet pressing is such that a high pressure is momentarily applied at the beginning of the cycle followed by the application of a relatively low pressure for a much longer period of time. During the pressing cycle, a pressure is constantly maintained on the mat even though there is a relatively sharp, drastic change in the pressure conditions during the early part thereof. The formed wet board is subsequently dried and baked, and the resultant fiberboard has a density in the range of 25-50 lbs. per cu. ft. The presence of added binder is of particular significance at the time the mat is removed from the press, since at this point the mat still contains a considerable amount of moisture and has a tendency to delaminate in the absence of added binder bonding the fibers together. If desired, the formed board may be further treated, as, for example, coated, tempered, and humidified.

These and other objects will be readily apparent from the preceding brief description and the following more detailed description and the appended drawings, wherein:

FIG. 1 is a schematic view of the process utilized in the present invention;

FIG. 2 is a diagram of a typical wet press cycle according to the present invention;

FIG. 3 is a cross-sectional view of a portion of the press utilized in the present invention.

Referring to FIG. 1, the raw materials 1 are fed into chipper 2. The raw materials are of a fibrous nature, usually a lignocellulose. The most common source of such lignocellulosic materials is wood, as, for example, the wood from cottonwood, pine, or willow trees. Non-wood fibrous raw materials may also be utilized, such as, for example, bagasse, flax, cereal straw, cotton stalks, corn stalks, and waste paper. The chipper 2 is usually of the mechanical type and grinds or decimates the raw materials into clusters of fibers of a size adaptable to be utilized in the chip pulper 3.

The latter reduces the raw material further into its basic fibrous form. Chip pulping may be either by mechanical pulping, thermal plus mechanical pulping, chemical plus mechanical pulping, or by the explosion process. Each of these chip pulping techniques is well known in the art, and no further description is necessary. In the instant process, chemical plus mechanical pulping is utilized, wherein the raw materials are treated in a neutral sulfite cook and are further reduced to a pulp with the aid of a disk refiner. It is understood, however, that any one of the usual chip pulping processes may be substituted for the semi-chemical process used herein, without departing from the spirit and intent of this invention.

The formed pulp is dumped in a stock chest 4 into which is also added a large amount of water to produce a slurry having approximately 2-4% fibrous solids. Into the stock chest are also poured the necessary additives, which, in the present process, are a resin binder, alum, and sulphuric acid. After a proper mixing time, the mixed materials are deposited upon a wet felter 5, which, in the instant process, is exemplified by a Fourdrinier machine. However, a pick-up machine of the Oliver type may be substituted therefor without departing from the spirit and intent of this invention. On the wet felter, the material is drained and lightly compressed resulting in a formed mat which contains approximately 25-35% fibrous solids. This technique of forming the mat is commonly referred to as the "wet felting technique" or the "wet lap method," as distinguished from those processes wherein the fibers are formed into a mat upon a conveyor while dry or are formed into a mat upon a conveyor while containing principally only the original moisture found within the raw materials together with a large percentage of wet binder. It is possible to obtain a formed mat by either of these latter two processes wherein the water percentage is quite high, and such a mat may be considered to be "wet" to a certain extent. However, this latter type of mat formed is to be distinguished from a mat formed by the wet felting technique, wherein the solids are deposited upon a conveyor from a slurry, which contains approximately 2-4% fibrous solids therein, and are subsequently drained to form a mat having approximately 25-35% fibrous solids therein.

The shaped mats are then cut to the approximate dimension of the final board design and are transferred to the hot wet press 6 of the process. In the press, the wet mat is formed into the approximate board form of the approximate proper density having a solids content of approximately 60-80%, preferably approximately 70-75%. The compressed mats are then transferred to a drying and baking oven 7, wherein the remaining mositure is evaporated and the boards are baked to set the binders therein. If desired, the hot pressed mats may be passed through a tempering chamber 8 before being dried in the oven 7; the tempering chamber may be an oil bath, so that tempering results from the action of the bath and the heat in the oven 7. The thusly produced boards may be humidified in a humidifier 9 and trimmed to the final size desired by trimming apparatus 10, resulting in the finished semi-hard fiberboard product suitable for field application. The thickness of the finished semi-hardboard usually ranges between ¼"-⅝", preferably between 7/16"-½". The over-all sizes of the boards vary depending upon the particular application. The boards may be made into 2' x 6', 2' x 8', or 4' x 8' sizes, or may be made into conventional over-all clapboard size, for example.

Referring to FIG. 2, the compressing cycle in the hot press 6 comprises a momentary application of high pressure to the mat within the press. The high pressure is subsequently reduced to a relatively very low pressure, without release of the pressure, and the lower pressure is maintained for a relatively long period of time. The initial high pressure should be in the range of approximately 150-1400 lbs. per sq. in., preferably between approximately 150-300 lbs. per sq. in. for the semi-chemical pulp or for the mixed hardwoods and 500-1400 lbs. per sq. in. for the groundwoods (usually only the softwoods). The particular high pressure selected is governed primarily by the type of fibers used, which taken into consideration the original ingredients and the process of fiberization, and the pressure is maintained on the mat until the water extruding from the mat stops cascading from the sides of the press. Cascading usually ceases within a period of time of less than one minute. The pressure on the mat is then reduced as rapidly as possible to a comparatively low pressure in the order of approximately 5-80 lbs. per sq. in., preferably in the range of 5-30 lbs. per sq. in. The latter pressure is maintained on the mat for a relatively long period of time as compared to the length of time of high pressure application in the cycle. The high pressure application is usually terminated within two minutes, which also includes the time for the rather fast pressure buildup and pressure decline; application of peak pressures for approximately 15-30 seconds have proven to be adequate. The low pressure application is maintained for approximately 6-15 minutes. At the end of the latter time interval, the low pressure is released as quickly as possible but at such a rate as to avoid "blowouts" within the compressed boards.

Referring to FIG. 3, the press utilized was of the multiple platen type, capable of handling in a single pressing operation at least 20 mats for compression into boards. The press 6 comprises a plurality of platens 12, each of which has on its lower face a screen 13 and a juxtapositioned plate 14, commonly referred to as a "hanging smooth plate." Beneath each hanging plate 14 is placed a formed mat 15, and on the opposite face of the mat is located a second screen 16 and a carrier plate or transfer plate 17. The latter plate is super-imposed over a wear plate 18 which is in contact with the next adjacent platen 12. The recited press apparatus, per se, is, for the most part, conventional and is of the type commonly utilized for pressing fibrous mats into hardboards.

The platens 12 are heated to a temperature of approximately 350°–450° F. In the instant press, the platens were heated by steam coils; it is understood, however, that other equivalent heating systems may be utilized to heat the platens. Although a screen 13 between the hanging smooth plate 14 and a platen 12 is also utilized in hardboard pressing techniques, it has been discovered that the mesh of the screen in the formation of the semi-hardboard of the present invention is critical to a certain degree in order to obtain the proper transference of heat from an upper platen 12, through the screen and a hanging smooth plate 14, and into the upper surface of the mat 15 being compressed. The range of screens found to be particularly adaptable for the present pressing technique were in the range of at least approximately 14 mesh, (.046" wire diameter). Screens of a finer mesh were found to transmit heat too rapidly, which resulted in warped boards.

A novel technique in the process of the present invention is the fact that the press is brought to its initial high pressure and also to the lower pressure without the use of stops in the press. Stops are usually inserted in a conventional press utilizing other pressure cycles prior to the initiation of the high initial pressure, or after full release of the high initial pressure and prior to application of the lower pressure. These stops limit the thickness to which the board may be manufactured by controlling the ultimate spacing between platens 12. In the instant process, the cycle is continuous without the assistance of such stops limiting the ultimate or intermediate spacing between platens. During high pressure application, the mat is initially compressed to a thickness somewhat less than that desired to be produced in the finished board. During the decrease in pressure, the platens separate slightly, brought about in part by spring-back of the mat, to a separating distance somewhat greater than the thickness desired in the ultimate board. Upon continued low pressure application, the thickness decreases slightly until the proper platen spacing is reached, which conforms to a thickness still slightly greater than the ultimate thickness desired in the finished board. However, at the end of the compression stage in the process, the wet board has retained therein approximately 20–40% moisture. Upon subsequent drying and baking in the oven 7, the water in the board is evaporated therefrom, and the board shrinks slightly to a thickness of board desired in the finished product.

In an illustrative example of forming the semi-hardboard of the present invention, a mixture of cotton wood and willow fibers was dumped into the stock chest 4 together with an amount of water sufficient to make a slurry having a fiber solids content of approximately 3½% (1 lb. of fiber per 3.43 gals. of water). A phenol formaldehyde thermosetting resin was added to the slurry as the binder; based on the weight of dry pulp, approximately 2% was added.

The mixture had also added thereto sufficient alum to precipitate the resins contained in the slurry mixture; based on the total weight of dry pulp and resin added, the alum was in the order of approximately 3% by weight. Sulphuric acid ($H_2SO_4$) was poured into the mixture after the alum addition, to bring the pH of the formed mixture to within the range of 4.7–4.9. Wax size, containing 46% solids, was added to increase the water resistance of the resultant fiberboard; based on the weight of solids to fiber and resin, approximately 1½% of size was used.

The mixture, after proper mixing, was thereafter deposited upon a Fourdrinier machine and a conveyor belt, wherein the liquid was drained from the mat upon the belt in sufficient quantities to effect a resultant solids content within the range of approximately 25–35%.

In the press, the platen temperatures were maintained between 370°–390° F. and the size of screen 13 was of a 14 mesh. The mats within the press were brought to 200 lbs. per sq. in. pressure within 30–50 seconds. This pressure was maintained until the water ceased to cascade from the sides of the press, which was within 15–30 seconds. The high pressure was reduced to approximately 30 lbs. per. sq. in. within 10–50 seconds, and this low pressure was maintained on the compressed mat for approximately 6–15 minutes. At the end of this time, the pressure was released within a release time of 2–45 seconds. The formed boards of a fibrous solids content of approximately 70% were then transferred to the drying, baking, humidifying, and trimming apparatus for further treatment.

The resultant fiberboards had the following characteristics:

| | | |
|---|---|---|
| Density (dry) | lbs. per cu. ft. | 39–42 |
| Modulus of rupture | lbs. per sq. in. | 3,500–4,500 |
| 96-hour swelling | percent | 8.5–10 |
| 96-hour water absorption | do | 20–25 |
| Hardness | | 600–700 |
| Thickness | in. | 7/16–5/8 |

The 96-hour swelling was determined by immersing test panels in water for 96 hours and comparing the resultant thickness with the original thickness of the panels utilizing the following formula:

$$\text{Swelling (96 hours)} = \frac{\text{Wet thickness} - \text{dry thickness}}{\text{Dry thickness}} \times 100$$

The 96-hour water absorption was determined from test panels immersed in water for 96 hours then utilizing the following formula:

$$\text{Absorption (96 hours)} = \frac{\text{Wet weight} - \text{dry weight}}{\text{Dry weight}} \times 100$$

The hardness is the Brinell hardness number of the panel × 1,000.

While the invention has been described in rather full detail, it will be understood that these details need not be strictly adhered to and that various changes and modifications may suggest themselves to one skilled in the art, all falling within the scope of the invention as defined by the subjoined claims.

What we claim is:

1. A method of manufacturing cellulosic semi-hardboard having a density of about 25–50 lbs. per cu. ft., and a thickness of about ¼ inch to about ⅝ inch, comprising the steps of forming a water-laid mat of cellulosic fibers containing added binder, compressing said mat in a press at an initial pressure in the range of approximately 150–1400 p.s.i. for a relatively short period of time but until a substantial amount of water has been expressed from the mat, reducing the pressure to the approximate range of 5–80 p.s.i., releasing the pressure on the compressed wet mat when the solids content thereof is approximately 60–80%, removing the mat from the press, and drying and baking the compressed mat to remove excess water.

2. A method of manufacturing cellulosic fiberboard of a density in the approximate range of 25–50 p.c.f. and having a thickness of about ¼ inch to about ⅝ inch, comprising the steps of forming a water-laid mat of cellulosic fibers having a fiber solids content in the range of approximately 25–35% and containing added binder, inserting a plurality of sheets of said mat in a multiple platen press, heating the platens of the press to a temperature in the approximate range of 350°–450° F., compressing said sheets for a relatively short period of time and at least to a condition wherein water ceases to cascade from the sides of the press, reducing the pressure on said sheets to the approximate range of 5–80 p.s.i., removing the compressed sheets from the press when the fiber solids content of the sheets is in the range of about 60–80%, and drying the sheets to remove excess water therein.

3. A method of manufacturing fiberboard having a density in the approximate range of 25–50 lbs. per cu. ft. and a thickness of about ¼ inch to about ⅝ inch from formed wet mats of cellulosic fibers having a fiber solids content in the range of approximately 25–35% comprising the steps of placing said mats in a multiple platen press, heating the platens of the press to a temperature between about 350°–450° F., pressing the mats in the press at a pressure between approximately 150–1400 p.s.i. for a substantial period of time but less than one minute nutil the major flow of water expressed from the mat has substantially ceased, reducing the pressure on the mats to approximately 5–80 p.s.i., maintaining the reduced pressure on the mats for a period of time of approximately 6–15 minutes, relieving the pressure on the mats after the fiber solids content within the mats is in the approximate range of 60–80%, removing the mats from the press, and drying the mats to remove excess moisture.

4. A method of manufacturing fiberboard as recited in claim 3, wherein the wet mats contain added binder.

References Cited
UNITED STATES PATENTS 2,046,750  7/1936  Mason _____ 162—225 X DONALL H. SYLVESTER, *Primary Examiner.*

HOWARD R. CAINE, *Examiner.*